United States Patent Office 2,725,765
Patented Dec. 6, 1955

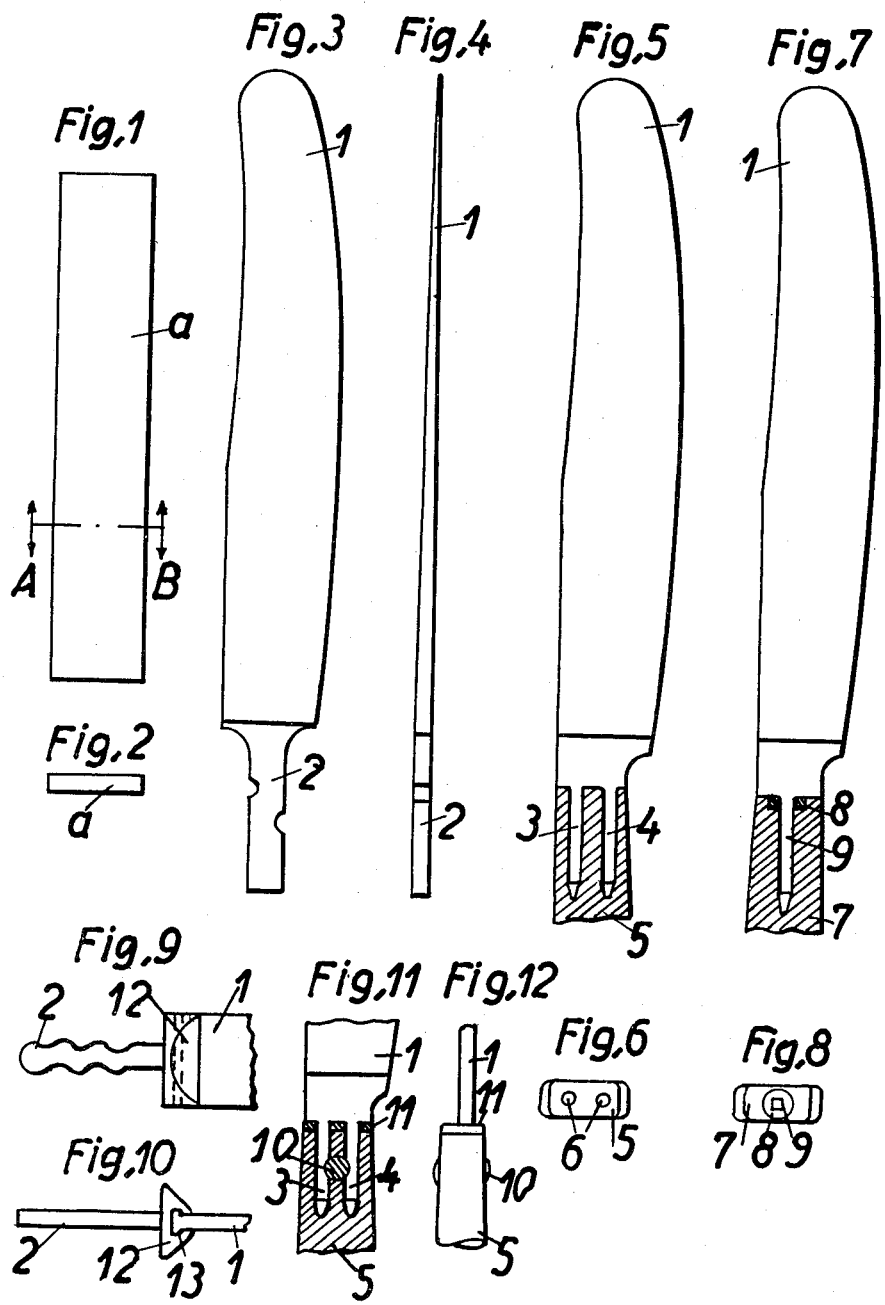

2,725,765

PROCESS FOR THE PRODUCTION OF KNIVES

Joseph Keller, Basel, Switzerland

Application June 7, 1951, Serial No. 230,310

3 Claims. (Cl. 76—104)

This invention relates to the production of knives which are set with a shank into a knife handle. These knives, which have a long length projecting freely from the hand-piece, are frequently exposed in use to bending stresses directed transversely to the plane of the blade, as a result of which the blade may suffer a permanent deformation at the transition point between the blade and handle, or may even break if the blade is made of brittle material. This led to a corresponding reinforcement of this transition point by thickening the material. For this purpose such knives have previously been drop-forged in an appropriately shaped die.

It is the object of the present invention to produce in a considerably more advantageous manner knife blades which are resistant to the bending stresses referred to above. Accordingly the present invention provides a process for the production of knives with blades which have considerable bending strength under transverse stress and which are set with a shank into a knife handle, comprising cutting off a workpiece from a bar of material of sufficient cross-section to withstand the bending stresses to be encountered and working said workpiece so as to form the blade from one side of the transition point between blade and handle and to form the shank from the other side of said point.

The knife blade can be formed by methods known per se, such for example as rolling, flattening out or forging. The rough bend-resistant knife blade produced in this way can be produced more cheaply than a drop-forged blade. In particular, compared to a bend-resistant knife blade provided with a collar produced by drop-forging, the knife blade of the invention possesses technical and economic advantages in the course of all the further working processes, such as hardening, pressing, grinding, smoothing and polishing which make it possible to produce a product of equal value more cheaply than hitherto.

The novel features which are considered as characteristic for the invention are set forth in particular in the appended claims. The invention itself, however, both as to its construction and its method of operation, together with additional objects and advantages thereof, will be best understood from the following description when read in connection with the accompanying drawings, in which:

Fig. 1 is a plan view of an initial knife blank;

Fig. 2 is an elevated view of the blank shown in Fig. 1;

Fig. 3 is a plan view of a table knife blade made according to the method of the present invention;

Fig. 4 is a side view of the table knife blade shown in Fig. 3;

Fig. 5 is a partial plan view, partially in cross section, of a different embodiment of a table knife made in accordance with the present invention;

Fig. 6 is an elevated view of the knife handle shown in cross section in Fig. 5;

Fig. 7 is a partial plan view, partially in cross section, of another embodiment of a table knife made in accordance with the present invention;

Fig. 8 is an elevated view of the knife handle shown in cross section in Fig. 7;

Fig. 9 is a partial plan view of another embodiment of a knife blade made in accordance with the method of the present invention;

Fig. 10 is a partial side view of the knife blade illustrated in Fig. 9;

Fig. 11 is a partial plan view, partially in cross section, of still another embodiment of a table knife made in accordance with the present invention; and Fig. 12 is a partial side view of the table knife illustrated in Fig. 11.

Referring now to the drawing, the workpiece *a* cut off from a bar of material of rectangular cross-section is worked to form the blade 1 from the line A—B forming the transition point from blade to handle, and is worked from the other side of this line to form the shank 2.

In the embodiment shown in Fig. 5 the shank is formed as a fork having two prongs 3 and 4 which ensure in a very simple way that the blade is set extraordinarily firmly in the handle. The prongs 3 and 4 of the fork are preferably of square cross-section and are pressed into round holes 6, which are bored at an appropriate spacing into the handle 5 from the front face thereof and are of a diameter corresponding to the length of the side of the cross-section of the prongs. The prongs scrape off from the periphery of the bore holes particles of the material of the handle, which consists for example of Celluloid, which lie in the way of the prongs and push these particles down to the bottom of the holes, which are bored somewhat deeper for this purpose. Since the knife blade is set in firmly in this way, it is possible to manage with a shorter shank than is usually the case.

In the embodiment shown by way of example in Figs. 7 and 8, a disc 8 is inserted into the top face of handle 7 and when the handle is pressed on disc 8, the same embraces tightly the root of the shank 9.

In the embodiment shown by way of example in Figs. 11 and 12, the blade is formed with a relatively short forked shank 3—4, set into the handle. A rivet 10 engaging the prongs of the fork and the handle ensures that the blade is joined securely to the handle. A disc 11 is applied to the top face of the handle. This disc prevents moisture from penetrating into the interior of the handle and reduces the danger of breaking of the prongs. In order to produce by the process of the invention knives provided with collars, use can be made in known manner, as shown in the embodiment of Figs. 9 and 10, of a collar 12 pressed on to the transition point from blade to handle. In order to facilitate pressing on, and to give a smooth joint between the collar and the blade, a small shoulder 13 is formed according to the invention on both broad sides of the blade where the collar is to be pressed on. When the collar is pressed on, the margin of the collar facing the blade is pressed against these shoulders. This makes it possible to join the collar tightly to the blade with considerably less pressure than would otherwise be necessary and to obtain a smooth transition from collar to blade.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim is:

1. In a method of making a knife, the steps of forming a bar-shaped blank having opposite broad sides; forming a knife blade and a tang from opposite end portions of said blank, while maintaining the original thickness of the blank at the junction portion between the knife blade and the tang, the junction portion being formed with shoulders extending along opposite sides thereof and projecting laterally beyond the sides of the knife blade and the tang; arranging a collar member having a pair of opposite leg portions on said junction portion with said opposite leg portions of said collar member extending along said laterally projecting shoulders of said junction portion; and pressing said leg portions inwardly over said shoulders toward said knife blade so as to firmly grip said shoulders.

2. In a method of making a knife, the steps of forming a bar-shaped blank of rectangular cross-section and having opposite broad sides; forming a knife blade and a tang of reduced width from opposite end portions of said blank, while maintaining the original thickness of the blank at the junction portion between the knife blade and the tang, the junction portion being formed with shoulders extending along opposite sides thereof and projecting laterally beyond the sides of the knife blade and the tang; arranging a collar member having a pair of opposite leg portions on said junction portion with said opposite leg portions of said collar member extending along said laterally projecting shoulders of said junction portion; and pressing said leg portions inwardly over said shoulders toward said knife blade so as to firmly grip said shoulders.

3. In a method of making a knife, the steps of forming a bar-shaped blank of rectangular cross-section and having opposite broad sides; forming a knife blade and a tang of reduced width from opposite end portions of said blank, while maintaining the original thickness of the blank at the junction portion between the knife blade and the tang, the junction portion being formed with shoulders extending along opposite sides thereof and projecting laterally beyond the sides of the knife blade and the tang; arranging a collar member having a pair of opposite leg portions on said junction portion with said opposite leg portions of said collar member extending along said laterally projecting shoulders of said junction portion, said collar member projecting transversely beyond the sides of said knife blade and said tang; and pressing said leg portions inwardly over said shoulders toward said knife blade so as to firmly grip said shoulders, said leg portions converging from the laterally projecting periphery of said collar member toward said knife blade.

References Cited in the file of this patent

UNITED STATES PATENTS

| | | |
|---|---|---|
| 54,189 | Merriam | Apr. 24, 1866 |
| 179,482 | Leonard | July 4, 1876 |
| 209,679 | Hart et al. | Nov. 5, 1878 |
| 361,620 | Dunn | Apr. 19, 1887 |
| 373,527 | Havell | Nov. 22, 1887 |
| 408,307 | Johnston | Aug. 6, 1889 |
| 515,835 | Lombard | Mar. 6, 1894 |
| 611,324 | Johnston | Sept. 27, 1898 |
| 624,380 | Rising | May 2, 1899 |
| 1,167,404 | Hoch | Jan. 11, 1916 |
| 1,806,244 | Echikson | May 19, 1931 |
| 1,967,479 | Platts | July 24, 1934 |
| 2,335,497 | Ehrsam | Nov. 30, 1943 |

FOREIGN PATENTS

| | | |
|---|---|---|
| 884 | Germany | 1877 |
| 23,355 | Great Britain | Nov. 7, 1898 |
| 687,620 | France | Apr. 29, 1930 |